United States Patent [19]

Jreij et al.

[11] Patent Number: 5,581,608
[45] Date of Patent: Dec. 3, 1996

[54] METHOD AND APPARATUS FOR MASKING THE REPORTING OF NETWORK TELEPHONY EVENTS TO A COMPUTER

[75] Inventors: Elie A. Jreij; Tave P. Dunn, both of Austin, Tex.; Michael J. Horowitz, Ann Arbor, Mich.; Peter E. Gersing, Cupertino, Calif.; Robert D. Whittington, Pflugerville, Tex.; Werner Huber, Munich, Germany

[73] Assignee: Rolm Systems, Santa Clara, Calif.

[21] Appl. No.: 405,614

[22] Filed: Mar. 15, 1995

Related U.S. Application Data

[63] Continuation of Ser. No. 936,963, Aug. 28, 1992, abandoned.
[51] Int. Cl.$^6$ ........................................ H04M 1/00
[52] U.S. Cl. ........................ 379/95; 379/201; 379/96; 379/93; 379/112
[58] Field of Search ................... 370/110.1, 60, 370/85.11, 68.1, 86; 379/96, 201, 211, 212, 90, 266, 62, 133, 112, 110, 136, 95, 94, 93

[56] References Cited

U.S. PATENT DOCUMENTS 4,782,482  11/1988  Kiatipov ................................. 370/86
4,864,601   9/1989  Berry ...................................... 379/96
4,893,310   1/1990  Robertson ........................... 370/110.1
4,932,022   6/1990  Keeney ................................... 370/60
4,961,189  10/1990  Cukier et al. .......................... 370/62
5,014,269   5/1991  Picandet ............................. 370/85.11
5,065,425  11/1991  Lecomte .................................. 379/96
5,150,357   9/1992  Hopner ................................ 370/68.1
5,343,516   8/1994  Callele et al. .......................... 379/90
5,377,261  12/1994  Baals et al. ............................ 379/201

*Primary Examiner*—Krista M. Zele
*Assistant Examiner*—Scott Wolinsky

[57] ABSTRACT

A method apparatus for selectively passing various types of telephony information between a data communications port on a digital telephone and a computer run application program. In one embodiment, the application program can select a subset of telephony events by way of a telephony command to the telephone's data communication port. This command is processed by a telephony command processor within the data communications controller which, in turn, sets a programmable event mask within the telephone. In response to the event mask being set, only the selected telephony events are spontaneously reported to the host computer and application program.

18 Claims, 5 Drawing Sheets

METHOD AND APPARATUS FOR MASKING THE REPORTING OF NETWORK TELEPHONY EVENTS TO A COMPUTER

CROSS-REFERENCE TO RELATED APPLICATION

This is a continuation of Ser. No. 07/936,963 filed Aug. 28, 1992, now abandoned.

BACKGROUND OF THE INVENTION

A. Field of the Invention

This invention relates to a telephone control interface system for use with digital telephones that are coupled to programmable computer control.

B. Related Art

A computer controllable telephone typically includes at least two ports: a telephone line interface for connection with a telephone network, and a data communication interface for communication with a computer. For example, a telephone such as the ROLMphone (R) 244PC includes a telephony port for providing connection to a private branch exchange (PBX) and an asynchronous data communication port for providing connection to a computer. The computer communicates with the phone via the data communication port in a manner similar to that in which it would communicate with a modem. Applications executing on the computer can control the phone, accessing the various PBX telephony features by way of a command set. A typical application would be, for example, an auto-dialer.

An increasingly popular network architecture is the integrated services digital network (ISDN). This network provides many features, including enhanced telephony services. The enhanced telephony services provide flexible control of telephone calls and communication of status information about the telephone. Examples of ISDN call status information include call state, calling number, available features and other events. By communicating the ISDN call status information to a host computer, via a telephone's data communications port, the operation of the telephone can be automated by a computer application program.

Conventionally, the telephone's data communications port will pass the ISDN call status information to the host computer's application program with no modification. This places the burden on the application to filter unwanted events. Application based filtering requires additional processing time and real time usage of the host computer where the application is running. Under this environment, telephony application programs must often be able to handle events that are not pertinent to the desired task.

SUMMARY OF THE INVENTION

As a solution to the above-described problem, the present invention provides a method and apparatus for selectively passing various types of ISDN call status information between the telephone's data communication port and a computer application program. In one embodiment, the application program can select a subset of ISDN call status events by way of a telephony command to the telephone's data communication port. This command is processed by a telephony command processor within the data communication controller which, in turn, sets a programmable event mask within the telephone. In response to the event mask being set, only the selected ISDN call status events are spontaneously reported to the host computer and application program.

BRIEF DESCRIPTION OF THE DRAWING

Like reference numerals appearing in more than one figure represent like elements.

DETAILED DESCRIPTION OF THE PREFERRED EMBODIMENT

The present invention enables a user application program to cause a connected telephone to selectively mask out spontaneous reporting of ISDN call status events. The application selects which ISDN call status events it is interested in receiving and communicates the identity of these events to the telephone by way of a Set Event Mask (SEM) command. The SEM command is recognized by the telephone's telephony command processor which, in turn, sets a mask in the telephony equipment. Once the mask is set, the telephone will limit the ISDN call status events spontaneously reported to the application program to those which were selected by the application.

Figure 1:
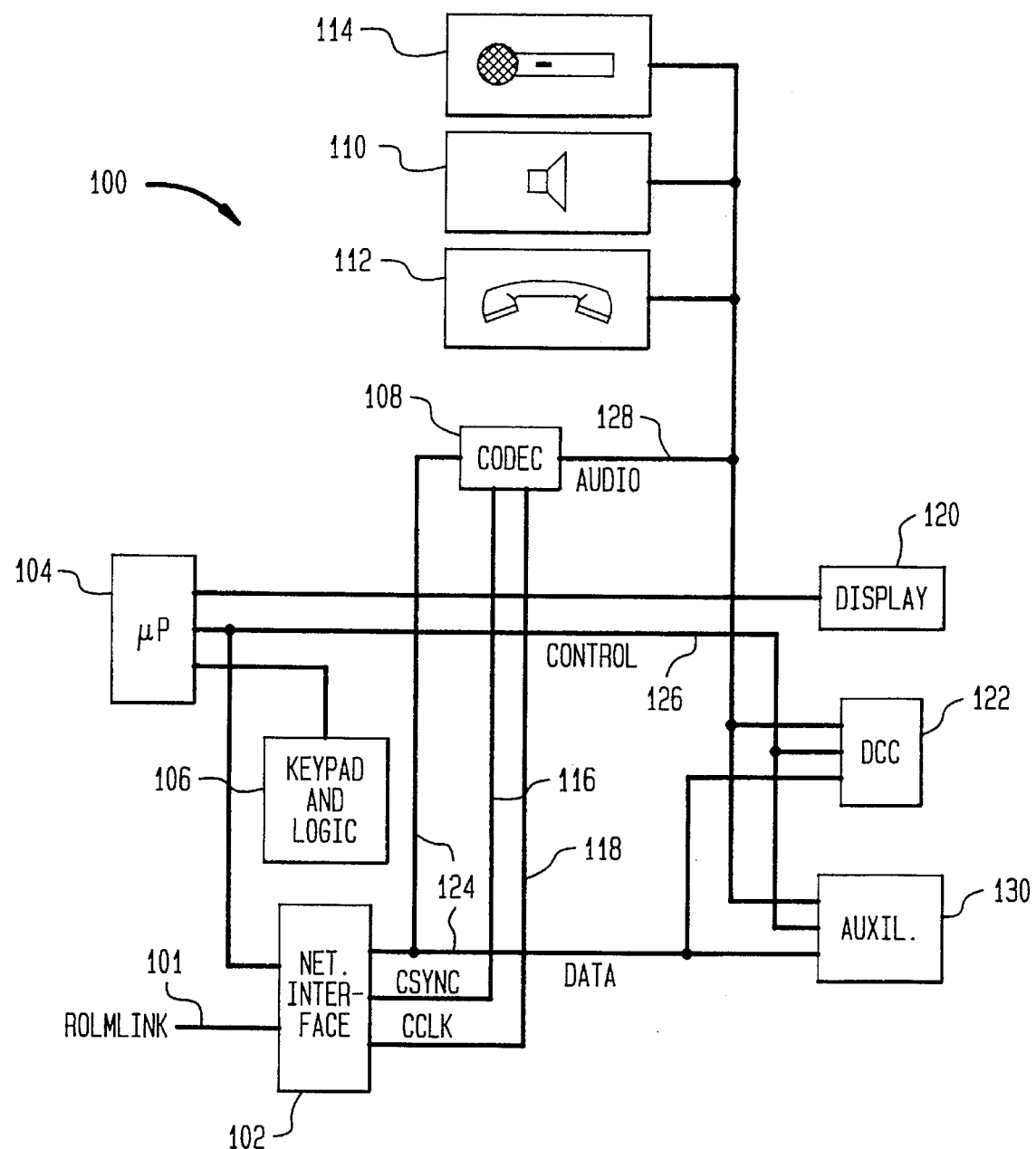
FIG. 1 depicts a digital telephone.

Turning first to FIG. 1, a digital telephone 100 is coupled to a PBX (not shown) by way of a network interface 102. The network interface 102 translates the network protocol (e.g. ROLMlink or ISDN) to the protocol of the telephone's internal data and control busses 124, 126 and handles transfers of telephone control information between a microprocessor 104 and the telephony line 101. The microprocessor 104, is connected to the network interface 102. The microprocessor 104 controls all of the telephone functions, and is the source and destination for all communications with the PBX. Also connected to the network interface and the microprocessor is a keypad and associated control logic 106. The keypad/control logic 106 includes the telephone keys, light emitting diodes (LEDs) and the associated control circuitry.

A coder/decoder (CODEC) 108 is connected to receive data output from the network interface 102. The CODEC 108 converts digital audio information into analog form to drive a speaker 110 and/or handset 112, and converts the analog information from a microphone 114 and/or the handset 112 to digital information destined for the network switch. The CODEC 108 is also connected to receive two clock signals from the network interface. The first of these signals, the CODEC sync (CSYNC) 116, tells the CODEC when to read a field in a data bus frame. The second, the CODEC clock (CCLK) 118, is a bit clock which runs at the bit transmission rate of the internal bus.

A digital LCD display 120 is also connected to the microprocessor 104. The display 120 is used to display data such as the number dialed, stored telephone numbers and other data provided by way of the microprocessor 104.

A data communications controller (DCC) 122, controlled by the microprocessor 104, provides the telephone with two RS-232 data communications ports. The DCC 122 is connected to the network interface 102 and the microprocessor 104. Although signals from the CODEC 108 are made available at the DCC interface, they are not used by the DCC 122. When a data connection is active, data from an optionally connected RS-232 device flows through the telephone and ROLMlink to the switch, from which it flows to another line or device.

The control bus 126 is the path for phone control information which is sourced by the microprocessor. An audio bus 128 carries analog audio information and provides an analog path to and from the CODEC 108.

Optionally, an auxiliary processing apparatus 130 can be provided. The auxiliary processing apparatus 130 is connected to the network interface 102 and the microprocessor 104 and may also be connected to the CODEC 108. The data communications controller 122 and the auxiliary processing apparatus 130 can be of a "plug in" type which is installable by the user.

Figure 2:
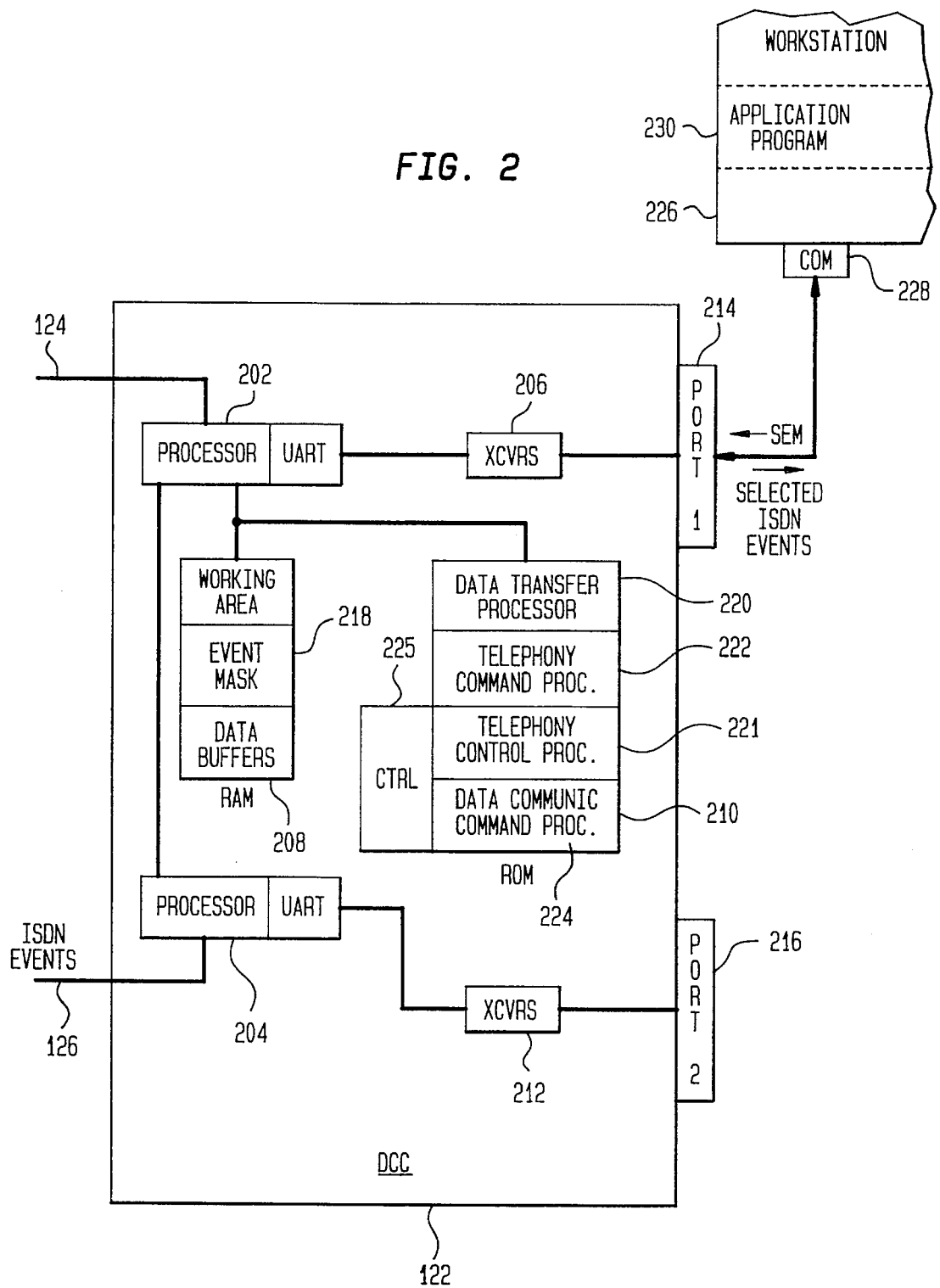
FIG. 2 is a more detailed diagram of the data communications controller in the telephone of FIG. 1.

A more detailed view of the data communications controller 122 is illustrated in FIG. 2. The DCC 122 includes two microprocessors 202, 204, each of which includes an internal UART (Universal Asynchronous Receiver/Transmitter). The primary microprocessor 202 (a Motorola 68302) is connected to the telephone's internal data bus 124, the secondary microprocessor 204, a set of RS-232 transceivers (XCVRS) 206, a random access memory (RAM) 208 and a read only memory (ROM) 210. The secondary microprocessor 204 (a Motorola 6805) is connected to the primary microprocessor 202, the control bus 126 and a second set of transceivers (XCVRS) 212. The transceivers 206, 212 are, in turn, respectively connected to a first RS-232 port (PORT1) 214 and a second RS-232 port (PORT2) 216.

The secondary microprocessor serves as a conduit between the primary microprocessor 202, and the control bus 126 and second RS-232 port 216. The secondary microprocessor includes internal code to pass ISDN call status events (received from the network via the control bus 126) to the primary microprocessor 202 and to pass commands and responses between the second communications port 216 and the primary microprocessor 202.

The RAM 208 provides workspace for the primary microprocessor and includes a data buffer area for the RS-232 ports. The RAM also includes a devoted address location for storing an event mask 218, which will be described in more detail later. The ROM 210 includes a number of programs (subroutines or processes) which are executed by the primary microprocessor 202. These processes include a data transfer processor 220, a telephony control processor 221, a telephony command processor 222 and a data communications command processor 224.

The data transfer processor 220 is a timer driven interrupt routine. The timer (internal to the primary microprocessor 202) runs at a sufficient rate to handle the necessary data transfer speeds on the RS-232 ports and the telephony link. The data communications command processor 224 and the telephony control processor 221 run in a main control loop 225, each processing one piece of information if any is present and then passing control to the next process. The data communications command processor 224 calls the telephony command processor 222 whenever a user enters a telephony command set (described in more detail later).

The data transfer processor 220 handles normal data transfers between the data bus 124 and the RS-232 communications ports 214, 216. The data transfer processor 220 also includes code for processing the escape sequence which enables a user or applications program, connected via an RS-232 port, to change the DCC from transparent mode (controlled by the data transfer processor) to command mode (controlled by either the telephony command processor or the data communications command processor).

The data communications command processor 224 handles data communications commands of the type well known in the art. The commands are sent by a connected apparatus (e.g. a workstation) via an RS-232 port. On power up, the DCC defaults to command mode and the data communications command processor 224. The data communications command processor controls the DCC in response to commands in accordance with the conventional "AT" command set, with extensions for activating the telephony command processor(s).

The telephony control processor 221 handles the telephony protocol that is received from the telephony network link. It interprets and responds to telephony commands such as LED cadence commands and ISDN call status events. In addition, the telephony control processor 221 sends information from the telephone to the link, such as information resulting from key depressions.

The telephony command processor 222 handles telephony commands. Like the data communications commands, the telephony commands are sent by a connected apparatus via an RS-232 port. Once in command mode, a user can activate the telephony command processor set by keying the proper AT command sequence (e.g. AT % U).

The telephony command processor can include more than one telephony command set, each of which can be entered by way of a distinct AT command. The use of escape sequences, a conventional data communications command set ("AT" commands) and a conventional telephony command set ("ROLM" commands) are described in more detail in the ROLMphone 244PC User's Manual (copyright 1987, 1988) available from ROLM Systems of Santa Clara Calif. The ROLMphone 244PC User's Manual is incorporated by reference herein, in its entirety, as if printed in full below.

According to an embodiment of the present invention, the telephony command processor 222 (hereinafter referred to as the CDLAPI) includes instructions for processing a set event mask (SEM) command.

As illustrated in FIG. 2, a computer workstation 226 can be coupled to either of the DCC's communications ports 214,216 by way of its own RS-232 data communication port 228. An application program 230, executing on the workstation 226, sends commands and data to the DCC 122 via the workstation's RS-232 port 228. According to an embodiment of the present invention, the application 230 selects which ISDN call status events it is interested in having spontaneously reported and communicates the identity of these events to the CDLAPI 222 by way of the Set Event Mask (SEM) command. The CDLAPI 222, in turn, sets a mask 218 in the RAM. Once the mask is set, the processor 202 limits the ISDN call status events reported to the application to those which were selected.

It should be understood that the SEM command actually performs two functions. In normal operation (when the SEM command has not been received by the CDLAPI) ISDN call status events are not spontaneously reported to the RS-232 ports (and thus the application). Once the SEM command is processed, the occurrence or change in state of any of the selected events will be spontaneously (without further request) reported to the application program via the RS-232 port on which the SEM command was received. In DCCs including more than one RS-232 port, a separate event mask location can be maintained for each. If an application wants to change the set of events which are spontaneously reported, it issues another SEM command which overwrites the old event mask (thus overriding the previous SEM command).

Figure 3:
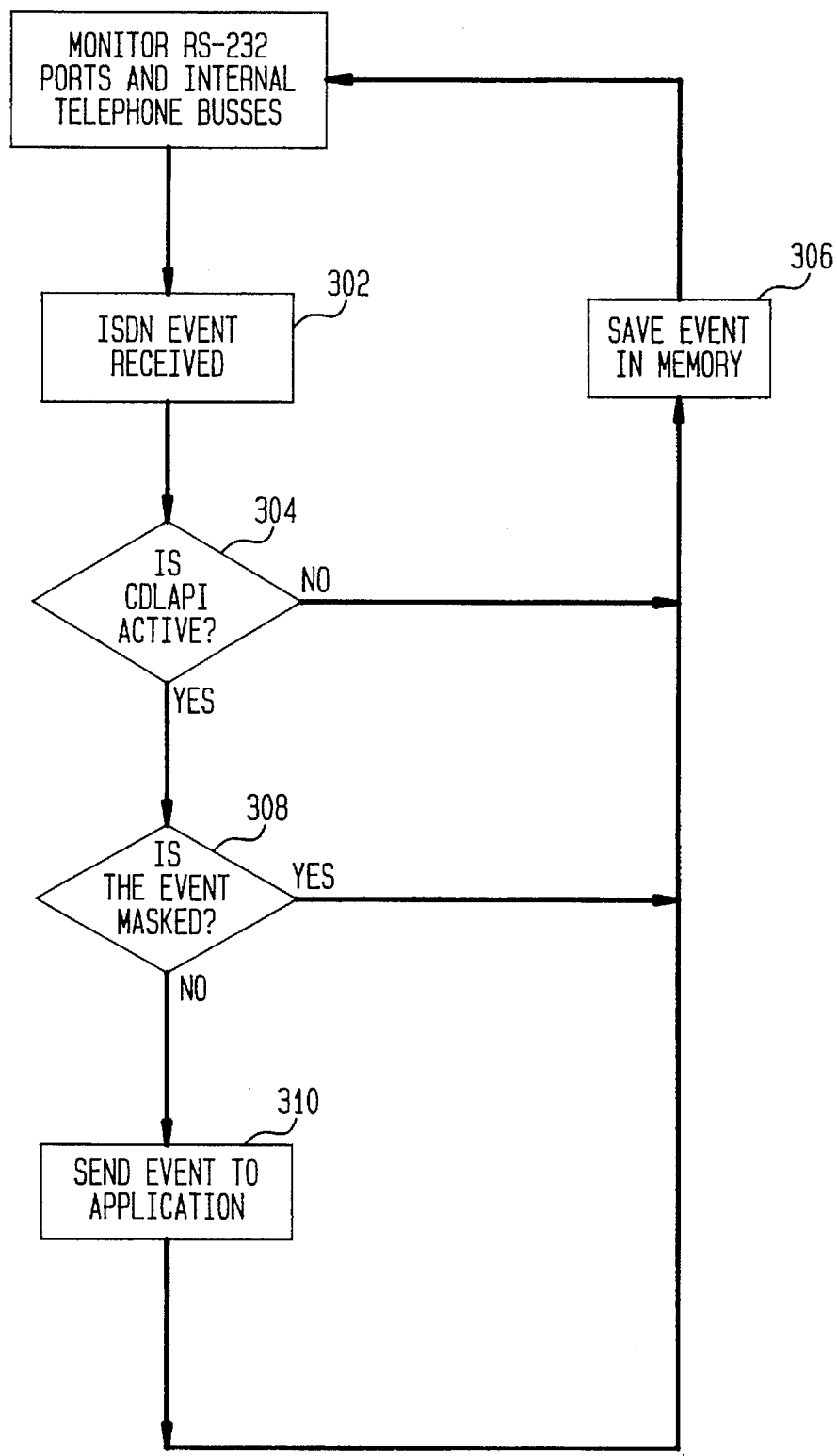
FIG. 3 is a flow chart of a method of event reporting by the data communications controller of FIG. 2.

A flow chart of the ISDN call status event handling in the DCC of FIG. 2 is illustrated in FIG. 3. In step 302 an ISDN call status event is received by the telephony control processor 221 from the control bus 126. In response to detection of the event, in step 304 the telephony control processor 221 checks a status area in the Ram to determine if the CDLAPI has been activated by an application. If the CDLAPI is not active, in step 306 the telephony control processor 221 stores the ISDN call status event in the working area of the Ram and returns to the control loop 225. If the CDLAPI is active, in step 308 the telephony command processor 222 checks the event mask for the application and determines whether the event is masked. If the event is not masked, in step 310 the telephony command processor 222 reports the event to the application and returns control to the telephony control processor 221. Then, in step 306, the telephony control processor 221 stores the event in the working area of the RAM. At startup time (when the telephone is initially powered up), the primary microprocessor 202 initializes the event mask 218 so that all events are masked (reporting is turned off). Thus, if no SEM commands are received by the CDLAPI 222, no events will be spontaneously reported to the application.

Figure 4:
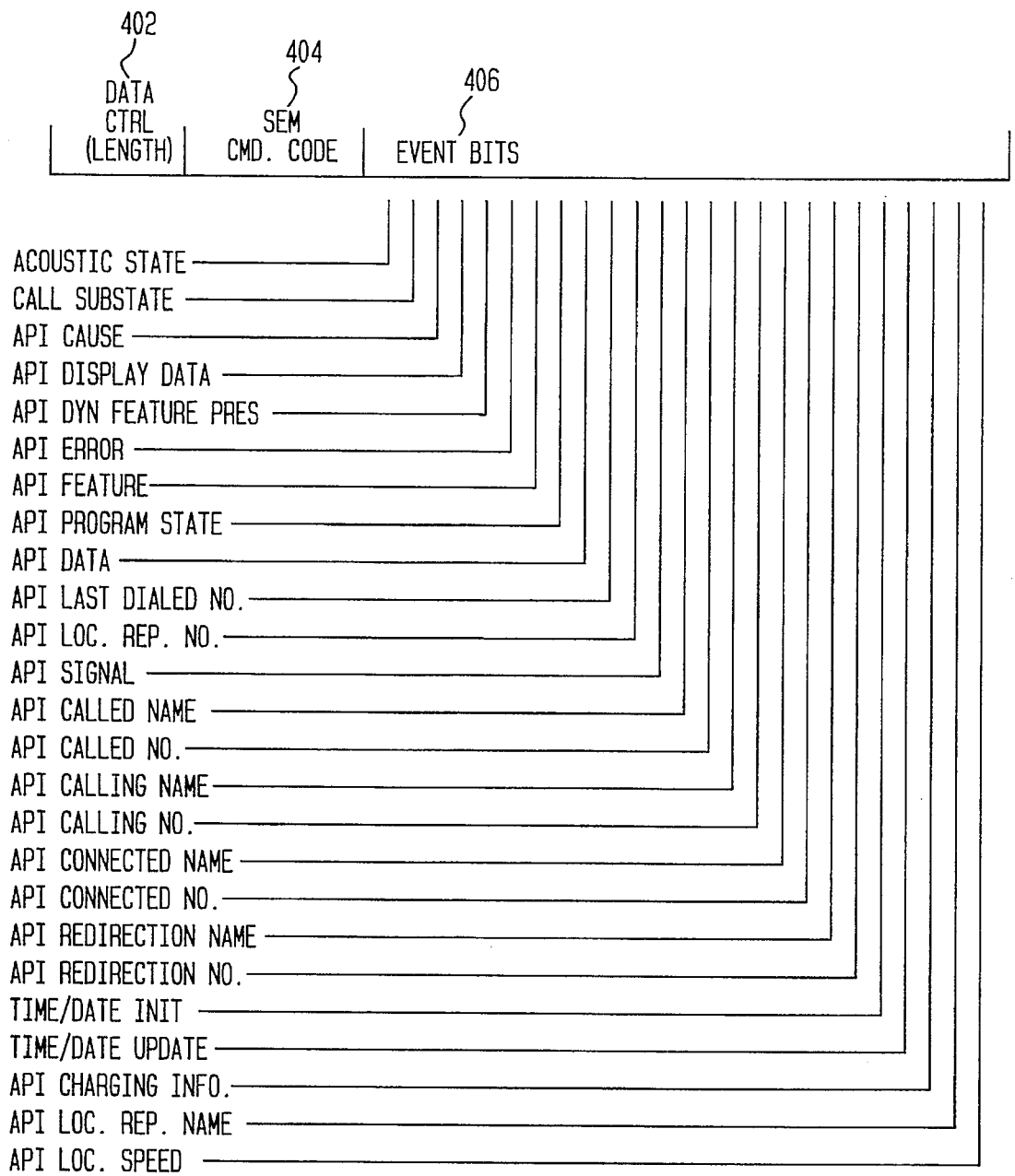
FIG. 4 is an exemplary format of a Set Event Mask (SEM) command.

An example of the Set Event Mask command format is illustrated in FIG. 4. The SEM command comprises three fields: a command length field 402, a command code 404 and an data (event) field 406. Each bit in the event field controls the masking of a particular ISDN call status event signal. As is conventional, unused bit positions are used as place holders to format the SEM command into 8 bit octets. The application chooses events to be signaled/received by setting the corresponding bit in the SEM command parameter to "1". In other words, a "1" in a particular bit location tells the DCC to signal a corresponding event to the application, while a zero in a location will cause the event signal to be masked such that the DCC will not signal the occurrence of the corresponding event.

It should be understood that the telephony equipment itself will continue to detect all ISDN call status events, although it will only signal to the application those events that were selected via the SEM command. Since all ISDN call status events are stored in the RAM 208, the application program can obtain the present status of any ISDN call status event by issuing a feature status refresh (FSR) command. The format of the FSR command is identical to that of the SEM command except that the command codes are distinct from one another and the event bits in the FSR command tell the CDLAPI which stored events to report from the working area of the RAM (rather than directly from the control bus as with the SEM command). When the CDLAPI receives an FSR command, it reads the status (in the working area of RAM 208) of each of the ISDN call status events indicated by the event field and immediately reports this status (one event at a time) to the application program. Unlike the SEM command, the FSR command does not cause any changes to the event mask 218 and will not cause the spontaneous reporting of the ISDN call status events as they occur.

The format of events reported to the applications program by way of the RS-232 port is also similar to that of the SEM command of FIG. 4. Each report includes a data control (message length) field, a distinct command code (indicating the event being reported) and a data field which indicates the status of the event (e.g. a calling name if the ISDN call status event is CALLING NAME or a calling number if the ISDN call status event is CALLING NO.).

Figure 5:
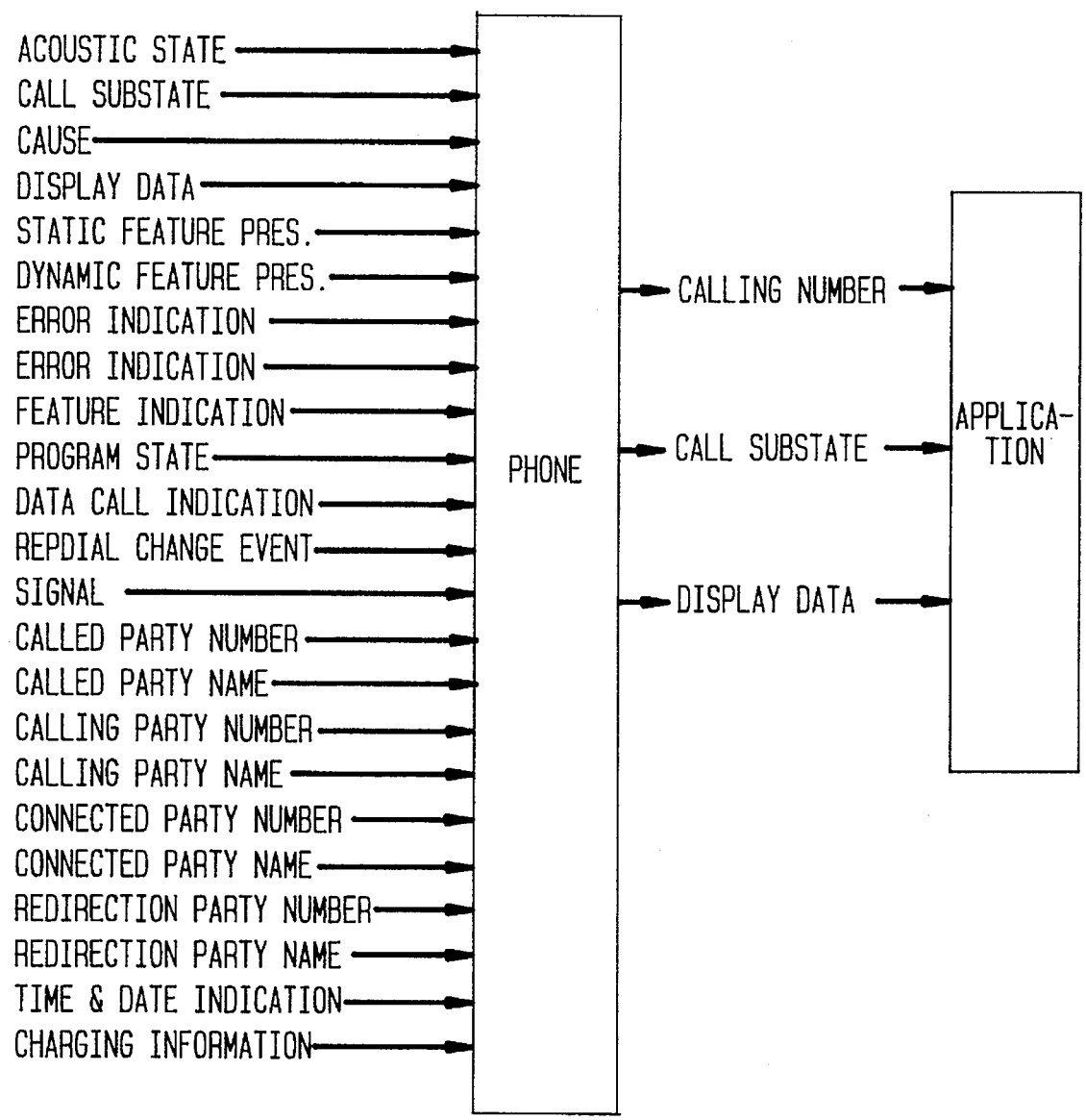
FIG. 5 illustrates the flow of events from the ISDN network to the phone and then to the application.

FIG. 5 illustrates the flow of events from the ISDN network to the phone and then to the application. The application chooses events to be received by setting the corresponding bit in the SEM command parameter. For example, assume the application is only interested in receiving the following ISDN call status events:

Display Data

Call Substate

Calling Party Number

From the DCC command mode, the application issues an AT% U command to switch to the CDLAPI command processor. Next, the application issues the SEM command with the bits corresponding to the display data, call substate and calling party number set (logical 1) and the remainder of the bits reset (logical 0). In this case, the telephone and DCC will still receive all the ISDN call status events, but the DCC will automatically send only a subset of the events to the application. It should be understood that the state of any event can be reported to the application program by way of a specific request. The SEM command only determines which events are automatically (spontaneously) reported upon occurrence.

A number of event masks can be provided so that each application can execute its own SEM command. In such an embodiment, each event mask would also include a field of information identifying the specific application to which it pertains. When an ISDN call status event occurs, the microprocessor can scan the table and send a report to the workstation, including the ISDN call status event and the application identifier for each application which is to automatically receive reporting of the event. Thus several applications attached to the same phone can receive different subsets of the ISDN call status event signals.

A number of enhancements can also be made to the above described embodiment. For example, the event mask 218 can be coupled to the phone keypad logic 106 such that it can be manually programmed by a user. In this embodiment, the telephone's base microprocessor 104 can recognize user entry of a given access code (for example a user depressing "S" "E" "M" on a the telephone's keypad). In response, the microprocessor 104 causes display 120 to display a mnemonic for each of the ISDN call status events. The mnemonics are cycled on the display 120 and enabled or disabled one by one. As each mnemonic identifying a particular ISDN call status event appears on the display, the user enters a '1" to enable reporting of that event or a '0' to disable reporting of the identified event. As an alternative a hexadecimal SEM control word can be entered on the keypad subsequent to the access code, thus programming the event mask. In any event, the base microprocessor 104 reports the user's selection to the DCC via the control bus 126. In response, the primary microprocessor 202 will set up the event mask accordingly.

Now that the invention has been described by way of the preferred embodiment, various enhancements and improvements which do not depart from the scope and spirit of the invention will become apparent to those of skill in the art. Thus it should be understood that the preferred embodiment has been provided by way of example and not by way of limitation.

The scope of the invention is defined by the appended claims.

We claim:

1. A digital telephone comprising:

a computer interface for coupling the telephone to a computer running an application program for controlling the masking of telephony events in the operation of said telephone;

a network interface for coupling said telephone to a communications network on which a plurality of telephony events occur;

detection means for detecting the occurrence of said plurality of telephony events; and, mask means coupled to said detection means and said computer interface, wherein said mask means prevents the reporting of masked telephony events to said computer and, in response to a command received from said computer, said mask means allows the reporting of non-masked telephony events, said non-masked telephony events being reported to said computer via said computer interface as said non-masked telephony events occur.

2. The digital telephone of claim 1, wherein said telephone is part of a telephone system.

3. The digital telephone of claim 1, wherein said telephony events are call status events.

4. The digital telephone of claim 1, further comprising:

storage means coupled to said detection means, for storing data indicative of said telephony events as they occur; and, command means coupled to said storage means, for causing data to be reported to said computer as determined by said mask means.

5. The digital telephone of claim 1 further comprising:

a keypad;

programing means coupled to said keypad and said mask means, for programming an event mask into said mask means via said keypad; and, a display coupled to said programming means.

6. The digital telephone of claim 5, wherein said mask means is responsive to either of said programming means and said command received from said computer.

7. The digital telephone of claim 6, wherein said communications network is an Integrated Services Digital Network (ISDN).

8. The digital telephone of claim 7, wherein ones of said telephony events are selected for reporting to said computer via a single set mask code entered on said keypad.

9. The digital telephone of claim 7, wherein data indicative of said telephony events is displayed on said display.

10. The digital telephone of claim 9, wherein ones of said telephony events are selected for reporting to said computer via said computer interface by way of a single entry on said keypad.

11. The digital telephone of claim 1, further comprising a plurality of mask means, each mask means comprising means for identifying a particular application program for controlling the masking of telephony events from among a plurality of application programs.

12. The digital telephone of claim 11, and further including processing means and memory means wherein said telephony events are stored in a table within said memory means, and said processing means scans said table and reports to said computer an application identifier along with non-masked telephony events for each of said application programs.

13. A method of operating a digital telephone, said method comprising the steps of:

coupling said telephone to a computer implementing an application program;

coupling said telephone to a communications network;

setting an event mask in a memory in said telephone in response to a command issued by said computer specifying telephony events to be masked, wherein masked telephony events are not reported to said computer;

detecting a plurality of telephony events occurring on said communications network; and, selectively reporting, as they occur, only non-masked telephony events to said computer.

14. The method of claim 13, further comprising the steps of:

storing data indicative of said plurality of telephony events as they occur; and, in response to a second command issued by said computer, causing data indicative of a first subset of masked telephony events to be reported to said computer.

15. The method of claim 14, further comprising the step of:

after reporting said first subset of masked telephony events, issuing a third command by said computer, said third command causing a second subset of said masked telephony events to be reported to said computer.

16. Telephony event processing apparatus, comprising:

a computer interface for coupling to a computer implementing a computer program;

a network interface for coupling to a communications network;

detection means for detecting a plurality of telephony call status events occurring on said communications network;

a memory; and, processor means, coupled to said detection means, said memory and said computer interface, for processing commands received from said computer and for setting an event mask in said memory in response to at least one of said commands, said at least one of said commands specifying telephony call status events to be masked, wherein masked telephony call status events are not reported to said computer;

the processor means further comprising means for automatically reporting non-masked telephony call status events indicated by said event mask to said computer.

17. The apparatus of claim 16, wherein said processor means further comprises means for storing information indicative of said telephony call status events.

18. The apparatus of claim 17, wherein said processor means further comprises means for reporting said information to said computer in response to a feature status refresh command issued by said computer.

\* \* \* \* \*